(12) United States Patent
Katayama et al.

(10) Patent No.: US 10,138,829 B2
(45) Date of Patent: Nov. 27, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventors: Masaaki Katayama, Susono (JP); Takeshi Hashizume, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 153 days.

(21) Appl. No.: 14/900,400

(22) PCT Filed: Jun. 28, 2013

(86) PCT No.: PCT/JP2013/067878
§ 371 (c)(1),
(2) Date: Dec. 21, 2015

(87) PCT Pub. No.: WO2014/207918
PCT Pub. Date: Dec. 31, 2014

(65) Prior Publication Data
US 2016/0153376 A1 Jun. 2, 2016

(51) Int. Cl.
*F02B 47/08* (2006.01)
*F02D 41/00* (2006.01)
(Continued)

(52) U.S. Cl.
CPC ....... *F02D 41/0052* (2013.01); *F02D 41/005* (2013.01); *F02D 41/0077* (2013.01);
(Continued)

(58) Field of Classification Search
CPC .............. F02M 25/07; F02M 25/0707; F02M 25/0709; F02M 26/00; F02M 26/05;
(Continued)

(56) References Cited

U.S. PATENT DOCUMENTS

2004/0194917 A1* 10/2004 Usui ................... F01P 3/14
 165/51
2006/0064966 A1* 3/2006 Opris ................. F01M 13/00
 60/283

(Continued)

FOREIGN PATENT DOCUMENTS

JP 10-318049 12/1998
JP 2010-71135 4/2010

OTHER PUBLICATIONS

U.S. Appl. No. 16/131,718, filed Sep. 14, 2018.

*Primary Examiner* — John Kwon
(74) *Attorney, Agent, or Firm* — Finnegan, Henderson, Farabow, Garrett & Dunner, LLP

(57) ABSTRACT

A control apparatus for an internal combustion engine according to the invention is applied to an internal combustion engine in which EGR gas and condensed water generated by an EGR cooler are supplied into a cylinder. The control apparatus calculates an equivalence ratio of the internal combustion engine, and controls an EGR valve and a condensed water supply valve such that, when the equivalence ratio is high, a supply rate of the condensed water increases and a supply rate of the EGR gas decreases relative to when the equivalence ratio is low.

5 Claims, 13 Drawing Sheets

(51) Int. Cl.
| | |
|---|---|
| *F02M 25/028* | (2006.01) |
| *F02M 25/022* | (2006.01) |
| *F02M 26/05* | (2016.01) |
| *F02M 26/06* | (2016.01) |
| *F02M 26/28* | (2016.01) |
| *F02M 26/24* | (2016.01) |
| *F02M 26/35* | (2016.01) |
| *F02D 41/30* | (2006.01) |
| *F02B 47/02* | (2006.01) |
| *F02D 41/06* | (2006.01) |
| *F02M 26/44* | (2016.01) |
| *F02D 41/14* | (2006.01) |

(52) U.S. Cl.
CPC ....... *F02D 41/068* (2013.01); *F02D 41/3005* (2013.01); *F02M 25/028* (2013.01); *F02M 25/0222* (2013.01); *F02M 26/05* (2016.02); *F02M 26/06* (2016.02); *F02M 26/24* (2016.02); *F02M 26/28* (2016.02); *F02M 26/35* (2016.02); *F02B 47/02* (2013.01); *F02D 41/0025* (2013.01); *F02D 41/06* (2013.01); *F02D 41/1454* (2013.01); *F02M 26/44* (2016.02); *Y02T 10/47* (2013.01)

(58) Field of Classification Search
CPC ........ F02M 26/06; F02M 26/07; F02D 19/00; F02D 19/021; F02D 19/0649
USPC ............................. 123/568.21, 575, 585, 590
See application file for complete search history.

(56) References Cited

U.S. PATENT DOCUMENTS

| | | | |
|---|---|---|---|
| 2006/0137665 A1* | 6/2006 | Khair | F02M 26/05 123/568.12 |
| 2008/0289600 A1* | 11/2008 | Kurotani | F02D 19/081 123/304 |
| 2010/0163006 A1* | 7/2010 | Otsubo | F02M 25/0748 123/568.2 |
| 2015/0354481 A1* | 12/2015 | Geckler | F02B 19/108 60/278 |

* cited by examiner

CONTROL APPARATUS FOR INTERNAL COMBUSTION ENGINE

CROSS-REFERENCE TO RELATED APPLICATIONS

This application is national phase application of International Application No PCT/JP2013/067878, filed Jun. 28, 2013, the content of which is incorporated herein by reference.

TECHNICAL FIELD

The invention relates to a control apparatus applied to an internal combustion engine having an exhaust gas recirculation (EGR) apparatus.

BACKGROUND ART

A conventional apparatus stores condensed water generated by an EGR cooler in a condensed water tank, and injects the stored condensed water into an intake passage (Patent Document 1). The condensed water supplied to the intake passage is led into a cylinder together with intake air and vaporized in the cylinder, thereby suppressing a combustion temperature. As a result, an amount of $NO_x$ generated in response to combustion is suppressed. Patent Document 2 may be cited as another related art document relating to the invention.

Patent Document 1: Japanese Patent Application Publication No. 10-318049 (JP 10-318049 A)

Patent Document 2: Japanese Patent Application Publication No. 2010-71135 (JP 2010-71135 A)

SUMMARY OF THE INVENTION

The amount of generated $NO_x$ can be reduced by supplying EGR as into the cylinder. When the amount of supplied EGR is increased, however, an in-cylinder density increases, thereby impairing the diffusion of fuel spray through the cylinder. Hence, when the amount of supplied EGR gas becomes excessive, a utilization rate of air in the cylinder decreases, and as a result, amounts of generated smoke and hydrocarbon (HC) may increase.

An object of the invention is therefore to provide a control apparatus for an internal combustion engine, with which increases in amounts of generated smoke and HC due to an increase in an in-cylinder density can be suppressed.

A first control apparatus according to the invention is applied to an internal combustion engine in which fuel is injected into a cylinder, the internal combustion engine including an EGR apparatus that supplies a part of exhaust gas into the cylinder as EGR gas, and a low density substance supply apparatus that supplies a low density substance having a lower density than the FUR gas into the cylinder. The first control apparatus includes equivalence ratio calculating means for calculating an equivalence ratio of the internal combustion engine, and supply rate control means for controlling the EGR apparatus and the low density substance supply apparatus such that, when the equivalence ratio is high, a supply rate of the low density substance increases and a supply rate of the FUR gas decreases relative to when the equivalence ratio is low.

According to the first control apparatus, when the equivalence ratio is high, the supply rate of the low density substance increases and the supply rate of the EGR gas decreases relative to when the equivalence ratio is low. Accordingly, the in-cylinder density decreases when the equivalence ratio is high and increases when the equivalence ratio is low. Hence, the in-cylinder density decreases at a high equivalence ratio, and therefore diffusion of the fuel spray can be promoted, with the result that the amounts of generated smoke and can be suppressed. On the other hand, the in-cylinder density increases at a low equivalence ratio, and therefore a penetration of the fuel spray can be reduced, with the result that increases in cooling loss and an amount of generated HC caused by fuel adhesion to an inner wall surface of the cylinder can be suppressed.

In the first control apparatus, there are no particular limitations on a method of calculating the equivalence ratio. For example, the equivalence ratio calculating means may calculate the equivalence ratio on the basis of an operating condition of the internal combustion engine.

In an aspect of the first control apparatus, the supply rate control means may control the EGR apparatus and the low density substance supply apparatus such that the supply rate of the low density substance in a case where the equivalence ratio is lower than a predetermined value is lower before warm-up of the internal combustion engine is complete than after warm-up of the internal combustion engine is complete. According to this aspect, the in-cylinder density is higher before warm-up of the internal combustion engine is complete than after warm-up is complete, and therefore the penetration of the fuel spray at a low equivalence ratio can be reduced in comparison with the penetration following the completion of warm-up. Hence, fuel adhesion to the inner wall surface of the cylinder prior to the completion of warm-up can be suppressed, and as a result, the amount of HC generated prior to the completion of warm-up can be reduced.

In an aspect of the first control apparatus, the supply rate control means may calculate the supply rate of the EGR gas and the supply rate of the low density substance on the basis of a fuel injection pressure as well as the equivalence ratio, and then control the EGR apparatus and the low density substance supply apparatus on the basis of an obtained calculation result. The penetration of the fuel spray varies in response to variation in the fuel injection pressure. According to this aspect, the supply rate of the EGR gas and the supply rate of the low density substance are calculated on the basis of the fuel injection pressure as well as the equivalence ratio, and therefore the penetration of the fuel spray can be made appropriate.

In an aspect of the first control apparatus, the low density substance supply apparatus may supply condensed water generated in an exhaust system of the internal combustion engine into the cylinder as the low density substance. According to this aspect, the condensed water generated in the exhaust system of the internal combustion engine is used, thereby eliminating the need to prepare and resupply a low density substance. Moreover, the supplied condensed water is vaporized in the cylinder, with the result that a combustion temperature decreases. At a high equivalence ratio, therefore, the condensed water supply rate is increased instead of reducing the EGR gas supply rate, and as a result, a $NO_x$ generation suppression effect can be maintained while suppressing an increase in the in-cylinder density.

A second control apparatus according to the invention is applied to an internal combustion engine in which fuel is injected into a cylinder, the internal combustion engine including an EGR apparatus that supplies a part of exhaust gas into the cylinder as EGR gas, and component proportion modifying means capable of modifying proportions of water and carbon dioxide in the EGR gas. The second control apparatus includes equivalence ratio calculating means for calculating an equivalence ratio of the internal combustion engine, and component proportion control means for controlling the component proportion modifying means such that, when the equivalence ratio is high, a proportion of water in the EGR gas increases and a proportion of carbon dioxide in the EGR gas decreases relative to when the equivalence ratio is low.

According to the second control apparatus, when the equivalence ratio is high, the proportion of water in the EGR gas increases and the proportion of carbon dioxide in the EGR gas decreases relative to when the equivalence ratio is low. Accordingly, the in-cylinder density decreases when the equivalence ratio is high and increases when the equivalence ratio is low. Hence, the in-cylinder density decreases at a high equivalence ratio, and therefore diffusion of the fuel spray can be promoted, with the result that the amounts of generated smoke and HC can be suppressed. On the other hand, the in-cylinder density increases at a low equivalence ratio, and therefore the penetration of the fuel spray can be reduced, with the result that increases in cooling loss and the amount of generated HC caused by fuel adhesion to the inner wall surface of the cylinder can be suppressed.

In the second control apparatus, there are no particular limitations on the method of calculating the equivalence ratio. For example, the equivalence ratio calculating means may calculate the equivalence ratio on the basis of an operating condition of the internal combustion engine.

In an aspect of the second control apparatus, the component proportion control means may control the component proportion modifying means such that the proportion of carbon dioxide in the EGR gas in a case where the equivalence ratio is lower than a predetermined value is lower before warm-up of the internal combustion engine is complete than after warm-up of the internal combustion engine is complete. According to this aspect, the in-cylinder density is higher before warm-up of the internal combustion engine is complete than after warm-up is complete, and therefore the penetration of the fuel spray at a low equivalence ratio can be reduced in comparison with the penetration following the completion of warm-up. Hence, fuel adhesion to the inner wall surface of the cylinder prior to the completion of warm-up can be suppressed, and as a result, the amount of HC generated prior to the completion of warm-up can be reduced.

In an aspect of the second control apparatus, the component proportion control means may calculate the proportion of water in the EGR gas and the proportion of carbon dioxide in the EGR gas on the basis of a fuel injection pressure as well as the equivalence ratio, and then control the component proportion modifying means on the basis of an obtained calculation result. According to this aspect, the proportion of water in the EGR gas and the proportion of carbon dioxide in the EGR gas are calculated on the basis of the fuel injection pressure as well as the equivalence ratio, and therefore the penetration of the fuel spray can be made appropriate.

In an aspect of the second control apparatus, separating means for separating carbon dioxide from the EGR gas, adjusting means capable of adjusting an amount of carbon dioxide separated from the EGR gas, and a condensed water supply mechanism that adds condensed water generated in an exhaust system of the internal combustion engine to the EGR gas from which carbon dioxide has been separated by the separating means may be provided as the component proportion modifying means. According to this aspect, the condensed water generated in the exhaust system of the internal combustion engine is used, thereby eliminating the need to prepare and resupply a low density substance. Moreover, the supplied condensed water is vaporized in the cylinder, with the result that the combustion temperature decreases. At a high equivalence ratio, therefore, the proportion of water in the EGR gas is increased instead of reducing the proportion of carbon dioxide in the EGR gas, and as a result, the $NO_x$ generation suppression effect can be maintained while suppressing an increase in the in-cylinder density.

MODES FOR CARRYING OUT THE INVENTION (First Embodiment)

Figure 1:
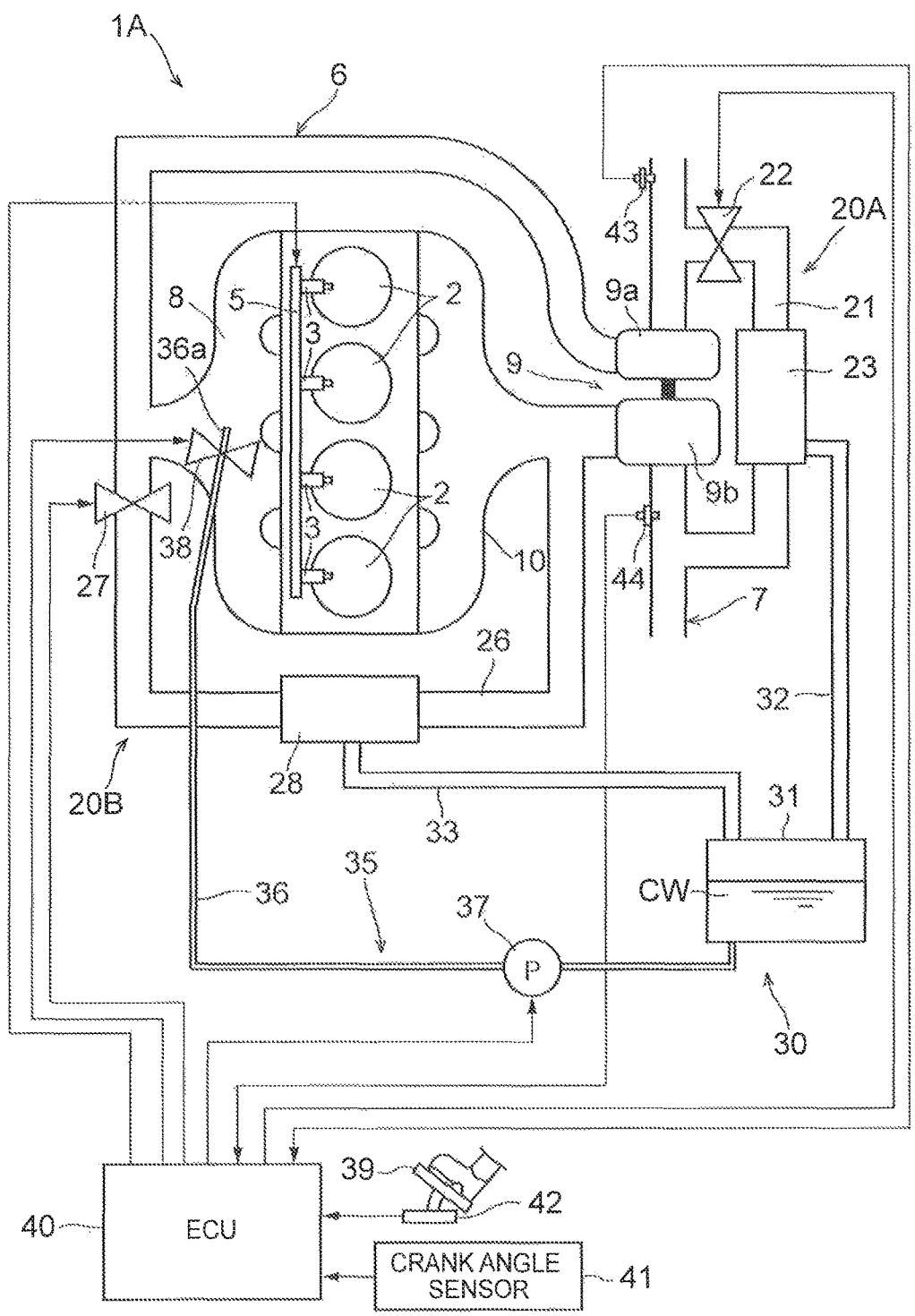
FIG. 1 is a view showing an overall configuration of an internal combustion engine according to an embodiment of the invention.

As shown in FIG. 1, an internal combustion engine 1A is configured as a series type four-cylinder diesel engine in which four cylinders 2 are disposed in a single direction. The internal combustion engine 1A is installed in an automobile, for example, as a travel drive source. A fuel injection valve 3 is provided in the internal combustion engine 1A for each cylinder 2 in order to supply fuel to the cylinders 2. The respective fuel injection valves 3 are connected to a common rail 5 to which fuel is pumped, and fuel is supplied to the respective fuel injection valves 3 through the common rail 5. An intake passage 6 and an exhaust passage 7 are connected to the respective cylinders 2. The intake passage 6 includes an intake manifold 8 that bifurcates to each cylinder 2. A compressor 9*a* of a turbocharger 9 is provided upstream of the intake manifold 8. The exhaust passage 7 includes an exhaust manifold 10 in which exhaust gas from the respective cylinders 2 is collected. A turbine 9*b* of the turbocharger 9 is provided downstream of the exhaust manifold 10. An exhaust gas purification apparatus, not shown in the drawing, is provided on a downstream side of the turbine 9*b* so that exhaust gas passing through the turbine 9*b* is purified by the exhaust gas purification apparatus and then released into the atmosphere.

As shown in 1, two EGR apparatuses 20A, 20B are provided in the internal combustion engine 1A in order to implement EGR such that a part of the exhaust gas is recirculated to the intake system as EGR gas in order to reduce $NO_x$ and improve fuel efficiency. The internal combustion engine 1A uses the two EGR apparatuses 20A, 20B appropriately in accordance with a load. The first EGR apparatus 20A is configured as a low pressure loop type EGR apparatus. The first EGR apparatus 20A includes a first EGR passage 21 that connects the exhaust passage 7 on a downstream side of the turbine 9*b* to the intake passage 6 on an upstream side of the compressor 9*a*, a first EGR valve 22 that regulates a flow of the EGR gas, and a first EGR cooler 23 that cools the EGR gas. The second EGR apparatus 20B is configured as a high pressure loop type EGR apparatus. The second EGR apparatus 20B includes a second EGR passage 26 that connects the exhaust manifold 10 to the intake manifold 8, a second EGR valve 27 that regulates the flow of the EGR gas, and a second EGR cooler 28 that cools the EGR gas.

The respective EGR coolers 23, 28 reduce a temperature of the EGR gas using cooling water of the internal combustion engine 1A as a coolant by performing heat exchange between the coolant and the warm exhaust gas. When the temperature of the EGR gas is reduced, moisture contained in the EGR gas condenses, and as a result, condensed water is generated in the respective EGR coolers 23, 28. A condensed water treatment apparatus 30 is provided in the internal combustion engine 1A in order to collect and treat the condensed water generated by the respective EGR coolers 23, 28.

The condensed water treatment apparatus 30 includes a condensed water tank 31 that stores the condensed water generated by the respective EGR coolers 23, 28, a first collection passage 32 that connects the first EGR cooler 23 to the condensed water tank 31, a second collection passage 33 that connects the second EGR cooler 28 to the condensed water tank 31, and a condensed water supply mechanism 35 serving as a low density substance supply apparatus that supplies condensed water CW stored in the condensed water tank 31 to the intake system of the internal combustion engine 1A. The condensed water supply mechanism 35 includes a condensed water passage 36 that connects the condensed water tank 31 to the intake manifold 8 of the intake passage 6. An electric pump 37 and a condensed water supply valve 38 that regulates a supply amount of condensed water pressurized by the pump 37 are provided in the condensed water passage 36. A tip end portion 36*a* of the condensed water passage 36 is configured in nozzle form so that when the condensed water supply valve 38 is opened, pressurized condensed water is injected from the tip end portion 36*a* in mist form. The condensed water supply amount can be controlled by controlling an opening of the condensed water supply valve 38.

An engine control unit (ECU) 40 is provided in the internal combustion engine 1A and configured as a computer that controls respective parts of the internal combustion engine 1A. The ECU 40 controls a fuel injection amount and an injection timing using the fuel injection valves 3 during main operational control, and is also used to control the EGR. apparatuses 20A, 20B and the condensed water treatment apparatus 30. Signals from a large number of sensors that detect various physical quantities are input into the ECU 40 in order to learn an operating condition of the internal combustion engine 1A. A crank angle sensor 41 that outputs a signal corresponding to a crank angle of the internal combustion engine 1A, an accelerator opening sensor 42 that outputs a signal corresponding to a depression amount (an accelerator opening) of an accelerator pedal 39 provided in the internal combustion engine 1A, an air flow meter 43 that outputs a signal corresponding to an air amount, an exhaust gas A/F sensor 44 that outputs a signal corresponding to an oxygen concentration of the exhaust gas, and so on, for example, are provided in the internal combustion engine 1A as sensors relating to the invention, and output signals from the sensors are input into the ECU 40.

A feature of this embodiment is that the ECU 40 controls a supply of the EGR gas and a supply of the condensed water in a coordinated fashion. When the amount of supplied EGR gas increases, a density (an in-cylinder density) of gas charged into the cylinder 2 increases, thereby impairing the diffusion of fuel spray through the cylinder 2, in other words, at a constant fuel injection pressure, a penetration of the fuel spray decreases steadily as the in-cylinder density increases. Accordingly, when the amount of supplied EGR gas becomes excessive, a utilization rate of air in the cylinder 2 decreases, and as a result, amounts of generated smoke and HC increase. Moreover, when the penetration is too strong, increases in cooling loss and the amount of generated HC occur as a result of fuel adhesion to an inner wall surface of the cylinder 2.

Figure 2:
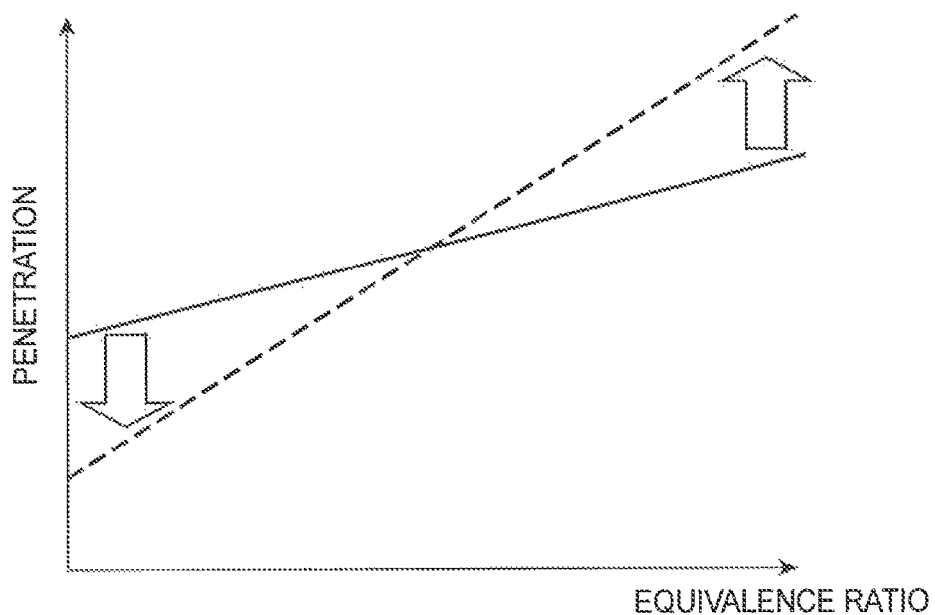
FIG. 2 is a view showing a relationship between an equivalence ratio and a penetration.

As shown by a solid line in FIG. 2, at a constant fuel injection pressure, the penetration of the fuel spray increases steadily as an equivalence ratio of the internal combustion engine 1A increases. To suppress increases in smoke and HC at a high equivalence ratio and to suppress increases in cooling loss and the HC generation amount at a low equivalence ratio, it is desirable to increase the penetration when the equivalence ratio is high and reduce the penetration when the equivalence ratio is low. In the control according to this embodiment, as shown by a dotted line in FIG. 2, the in-cylinder density is varied in accordance with the equivalence ratio in order to increase the penetration when the equivalence ratio is high and reduce the penetration when the equivalence ratio is low. Further, the in-cylinder density is varied by varying an EGR gas supply rate and a condensed water supply rate in accordance with the equivalence ratio.

The EGR gas is exhaust gas generated as a result of fuel combustion, and therefore contains carbon dioxide ($CO_2$) and water ($H_2O$) as main components. Further, the main component of the condensed water is water. Hence, by varying the EGR gas supply rate and the condensed water supply rate, a proportion of carbon dioxide and a proportion of water in the gas charged into the cylinder 2 can be varied. In other words, when the EGR gas supply rate decreases, the proportion of carbon dioxide in the cylinder 2 decreases, and when the condensed water supply rate increases, the proportion of water in the cylinder 2 increases. Water is a low-density substance having a lower molecular weight than carbon dioxide. Therefore, variation in the proportion of carbon dioxide and the proportion of water in the cylinder 2 leads to variation in the in-cylinder density.

Figure 3:
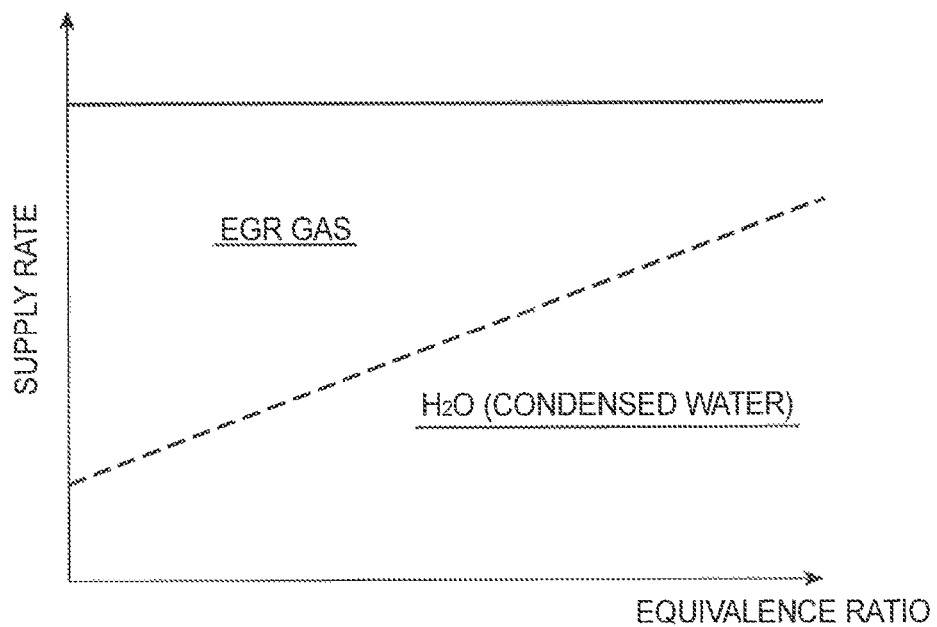
FIG. 3 is a view showing a characteristic of a calculation map used to calculate supply rates of EGR gas and condensed water.

As shown in FIG. 3, in the control according to this embodiment, the condensed water supply rate is increased and the EGR gas supply rate is reduced when the equivalence ratio is high relative to when the equivalence ratio is low. In so doing, the in-cylinder density decreases when the equivalence ratio is high relative to when the equivalence ratio is low, and as a result, as shown by the dotted line in FIG. 2, the penetration increases when the equivalence ratio is high and decreases when the equivalence ratio is low.

The ECU 40 manipulates the EGR gas supply rate and the water supply rate respectively in accordance with the equivalence ratio as specified by the calculation map shown in FIG. 3. The EGR gas supply amount can be controlled in accordance with respective openings of the EGR valves 22, 27, while the condensed water supply amount can be controlled in accordance with an opening of the condensed water supply valve 38. The ECU 40 therefore specifies an EGR gas supply rate and a condensed water supply rate corresponding to the equivalence ratio by referring to the calculation map shown in FIG. 3. The ECU 40 then calculates openings of the respective EGR valves 22, 27 and an opening of the condensed water supply valve 38 at which these supply rates are realized, and controls the respective valves 22, 27, 38 so as to realize the openings. The openings of the respective valves 22, 27, 38 are calculated on the basis of a specification result obtained by specifying a correspondence relationship between the EGR gas and condensed water supply rates and the openings of the respective valves 22, 27, 38 in advance through prototype tests and simulations. As described above, the two EGR apparatuses 20A, 20B are used appropriately in accordance with the load of the internal combustion engine 1A. In other words, three modes, namely a mode in which the two EGR apparatuses 20A, 20B are used simultaneously, a mode in which only the first EGR apparatus 20A is used, arid a mode in which only the second EGR apparatus 20B is used, exist as EGR implementation modes. Hence, the openings of the respective valves 22, 27, 38 are calculated for each mode.

Figure 4:
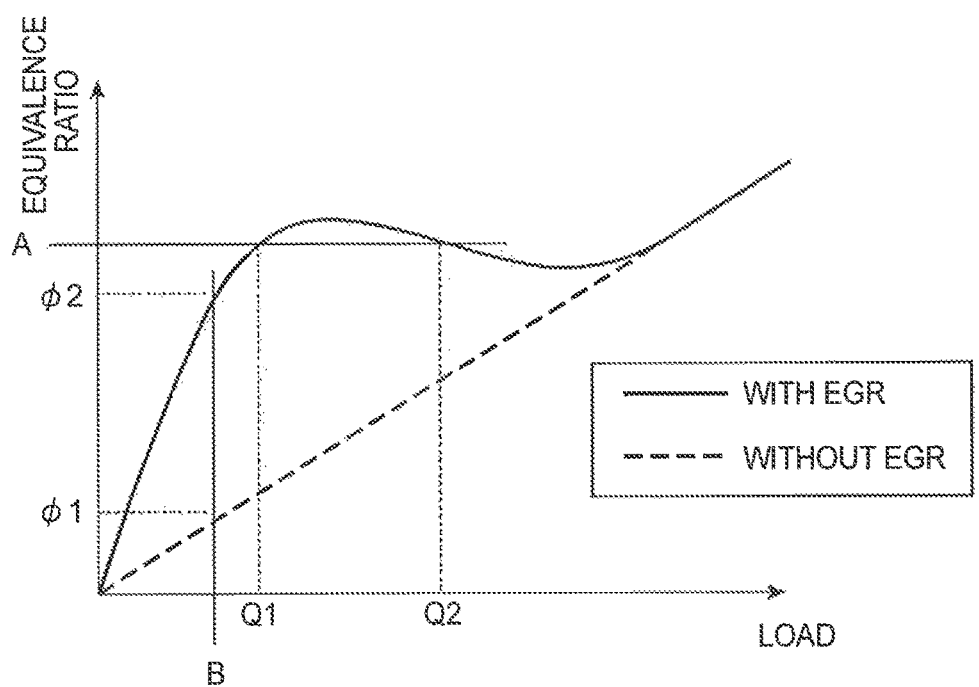
FIG. 4 is a view showing a characteristic of a map used to calculate a basic equivalence ratio corresponding to a load.

As shown in FIG. 4, a relationship between the equivalence ratio and the load (the fuel injection amount) of the internal combustion engine 1A is not a simple proportional relationship, and varies according to whether or not EGR is underway and the amount of EGR. In other words, the load may vary at a constant equivalence ratio, as shown by A in FIG. 4, and the equivalence ratio may vary at a constant load depending on whether or not EGR is underway, as shown by B in FIG. 4. In the control according to this embodiment, the EGR gas supply rate and the condensed water supply rate are controlled on the basis of the equivalence ratio, and therefore the in-cylinder density can be controlled accurately without being affected by whether or not EGR is underway and the EGR amount.

Figure 5:
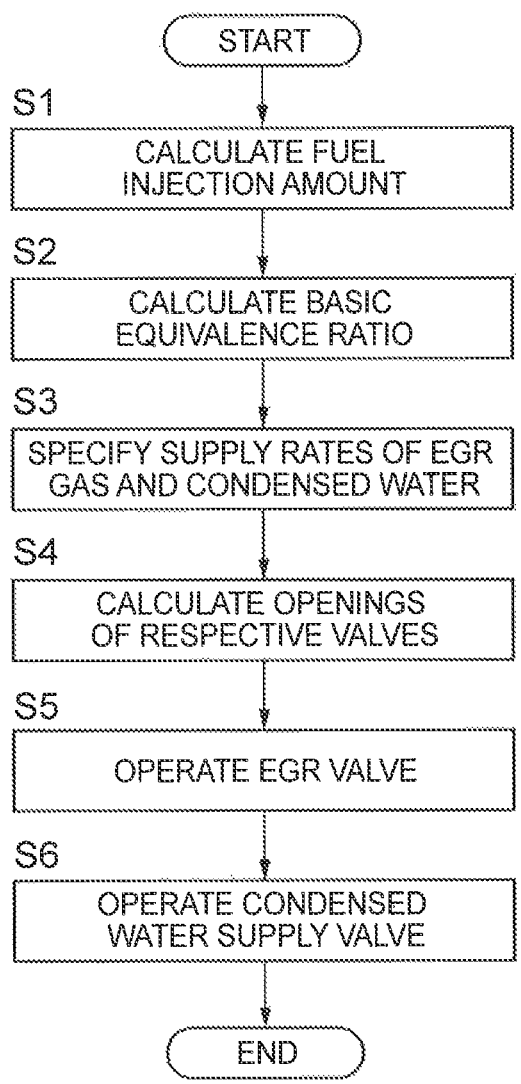
FIG. 5 is a flowchart showing an example of a control routine according to a first embodiment.

FIG. 5 shows an example of a control routine implemented by the ECU 40. A program of the control routine shown in FIG. 5 is stored in the ECU 40, read at an appropriate time, and executed repeatedly at predetermined intervals.

In step S1, the ECU 40 calculates the fuel injection amount of the internal combustion engine 1A. The ECU 40 specifies the accelerator opening by referring to the output signal from the accelerator opening sensor 42, and calculates the fuel injection amount on the basis of the accelerator opening. In step S2, the ECU 40 calculates a basic equivalence ratio on the basis of the operating condition, or in other words the fuel injection amount (the load), of the internal combustion engine 1A. The basic equivalence ratio is an equivalence ratio defined univocally in accordance with the fuel injection amount and specified by a map having a characteristic such as that shown in FIG. 4. Referring to the map shown in FIG. 4, the ECU 40 calculates the basic equivalence ratio on the basis of the fuel injection amount (the load) calculated in step S1 and whether or not EGR is being implemented. For example, as shown in FIG. 4, when the load is B and EGR is being implemented, $\phi 2$ is calculated as the basic equivalence ratio, whereas when the load is B and EGR is not being implemented, $\phi 1$ is calculated as the basic equivalence ratio. As is commonly practiced, the equivalence ratio is defined as the inverse of the excess air ratio, which is obtained by dividing the air-fuel ratio by the stoichiometric air-fuel ratio.

In step S3, the ECU 40 specifies the EGR gas supply rate and the condensed water supply rate corresponding to the basic equivalence ratio calculated in step S2 by referring to the calculation map shown in FIG. 3. In step S4, the ECU 40 calculates the respective openings of the EGR valves 22, 27 and the condensed water supply valve 38 on the basis of the respective supply rates specified in step S3. Note that in the mode where the first EGR apparatus 20A and the second EGR apparatus 20B are used simultaneously, the ECU 40 calculates the respective openings of the two EGR valves 22, 27 and the condensed water supply valve 38. Further, in the mode where the first EGR apparatus 20A is used alone, the ECU 40 calculates the respective openings of the first EGR valve 22 and the condensed water supply valve 38. Furthermore, in the mode where the second EGR apparatus 20B is used alone, the ECU 40 calculates the respective openings of the second EGR valve 27 and the condensed water supply valve 38.

In step S5, the ECU 40 operates at least one of the first EGR valve 22 and the second EGR valve 27 to realize the openings calculated in step S6. In step S6, the ECU 40 operates the condensed water supply valve 38 to realize the opening calculated in step S4. The current routine is then terminated.

The openings of the respective valves 22, 27, 38 calculated in step S4 of FIG. 5 are calculated on the basis of the supply rates specified by the calculation map shown in FIG. 3. Therefore, by operating the respective valves 22, 27, 38 to the openings calculated in step S4, an EGR gas supply rate and a condensed water supply rate corresponding to the current equivalence ratio are realized.

According to this embodiment, therefore, the in-cylinder density of the internal combustion engine 1A decreases when the equivalence ratio is high and increases when the equivalence ratio is low. Hence, the in-cylinder density decreases at a high equivalence ratio, and therefore diffusion of the fuel spray can be promoted, with the result that the amounts of generated smoke and HC can be suppressed. On the other hand, the in-cylinder density increases at a low equivalence ratio, and therefore the penetration of the fuel spray can be reduced, with the result that increases in cooling loss and the amount of generated HC caused by fuel adhesion to the inner wall surface of the cylinder 2 can be suppressed. By executing the control routine shown in FIG. 5, the ECU 40 functions as supply rate control means according to the invention. Further, by executing step S2 of FIG. 5, the ECU 40 functions as equivalence ratio calculating means according to the invention.

(Second Embodiment)

Figure 6:
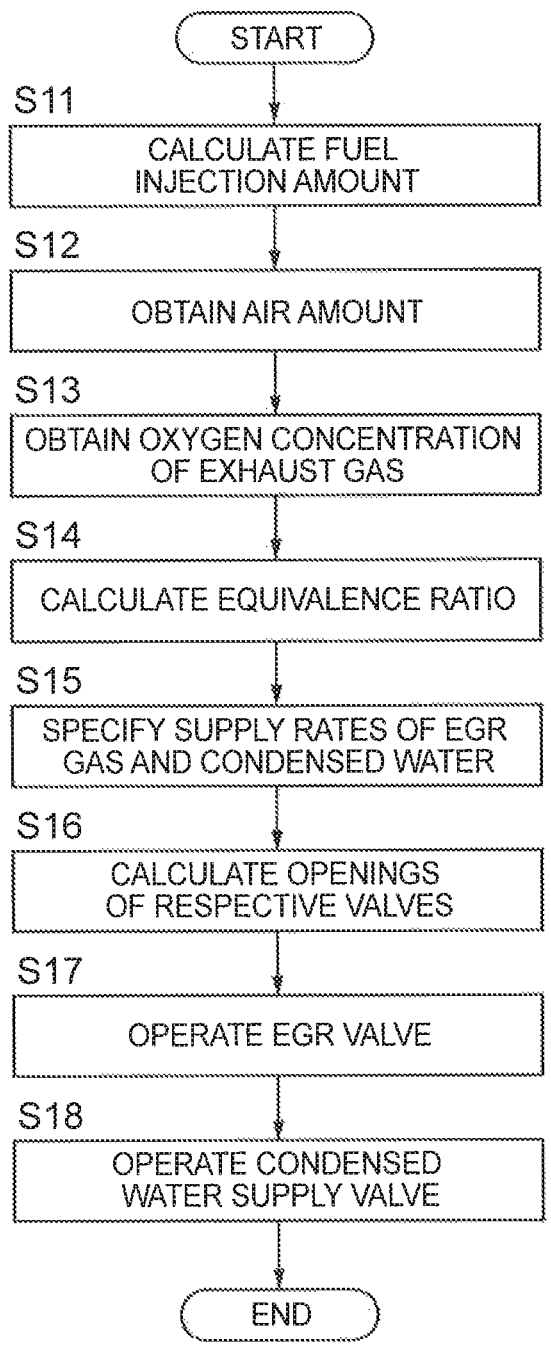
FIG. 6 is a flowchart showing an example of a control routine according to a second embodiment.

Next, referring to FIG. 6, a second embodiment of the invention will be described. The second embodiment is identical to the first embodiment apart from the control content. The physical configuration of the second embodiment can therefore be understood with reference to FIG. 1. The second embodiment differs from the first embodiment in the method of calculating the equivalence ratio. A program of a control routine shown in FIG. 6 is stored in the ECU 40, read at an appropriate time, and executed repeatedly at predetermined intervals.

In step S11, similarly to the first embodiment, the ECU 40 specifies the accelerator opening by referring to the output signal from the accelerator opening sensor 42, and calculates the fuel injection amount on the basis of the accelerator opening. In step S12, the ECU 40 obtains an air amount by referring to the output signal from the air flow meter 43. In step S13, the ECU 40 obtains the oxygen concentration of the exhaust gas by referring to the output signal from the exhaust gas A/F sensor 44. In step S14, the ECU 40 calculates the equivalence ratio of the internal combustion engine 1A on the basis of the fuel injection amount, the air amount, and the oxygen concentration obtained respectively in steps S11 to S13. Processing performed in steps S15 to S18 is identical to that of steps S3 to S6 according to the first embodiment, shown in FIG. 5, and therefore description thereof has been omitted.

According to the second embodiment, similarly to the first embodiment, the amounts of generated smoke and HC can be suppressed when the equivalence ratio is high, and increases in cooling loss and the amount of generated HC can be suppressed when the equivalence ratio is low. By executing the control routine shown in FIG. 6, the ECU 40 functions as the supply rate control means according to the invention. Further, by executing step S14 in FIG. 6, the ECU 40 functions as the equivalence ratio calculating means according to the invention.

(Third Embodiment)

Next, referring to FIGS. 7 to 9, a third embodiment of the invention will be described. The third embodiment is identical to the first embodiment apart from the control content. The physical configuration of the third embodiment can therefore be understood with reference to FIG. 1. The ECU 40 controls a fuel injection pressure of the internal combustion engine 1A, or in other words an internal pressure of the common rail 5, in accordance with the operating condition of the internal combustion engine 1A. When the fuel injection pressure varies, the penetration of the fuel spray is affected thereby, and it may therefore be impossible to obtain an appropriate penetration simply by varying the in-cylinder density in a similar manner to the first or second embodiment. Hence, in the third embodiment, an appropriate penetration is obtained by calculating the EGR gas supply rate and the condensed water supply rate on the basis of the fuel injection pressure as well as the equivalence ratio.

Equation 1, shown below, which is called as "Hiroyasu's formula", is widely available as an empirical formula defining a relationship between the fuel injection pressure and the penetration strength.

$$S = 2.95 \times ((P_{inj} - P_a)/\rho_a)^{0.25} \times (d_0 \cdot t)^{0.5} \qquad 1$$

Here, S denotes the penetration strength, $P_{inj}$ denotes the fuel injection pressure, $P_a$ denotes an in-cylinder atmospheric pressure, $\rho_a$ denotes the in-cylinder density, dd-enotes an injection hole diameter, and t denotes time.

The in-cylinder density $\rho_a$ and the in-cylinder atmospheric pressure $P_a$ are commensurate, and therefore, when A is set as a coefficient, Equation 1 may be seen as Equation 2, shown below.

$$S = A \times ((P_{inj} - P_a)/\rho_a)^{0.25} = A \times (P_{inj}/P_a - 1)^{0.25} \qquad 2$$

By solving Equation 2 with respect to the in-cylinder atmospheric pressure $P_a$ and setting B as a coefficient, Equation 3 is obtained.

$$P_a = B \times P_{inj}/(S^4 + 1) \qquad 3$$

Furthermore, the in-cylinder density $\rho_a$ and the in-cylinder atmospheric pressure $P_a$ are commensurate, as described above, and therefore, when C is set as a coefficient, Equation 3 may be seen as Equation 4, shown below.

$$\rho_n = C \times P_{inj}/(S^4 + 1) \qquad 4$$

Here, a desired penetration strength is determined for each equivalence ratio (see FIG. 2) and inserted into Equation 4. As a result, a relationship between the fuel injection pressure and the in-cylinder density at which to obtain the desired penetration strength is obtained for each equivalence ratio. By ordering these three parameters, i.e. the equivalence ratio, the fuel injection pressure, and the in-cylinder density, a map shown in FIG. 7 is obtained.

Figure 7:
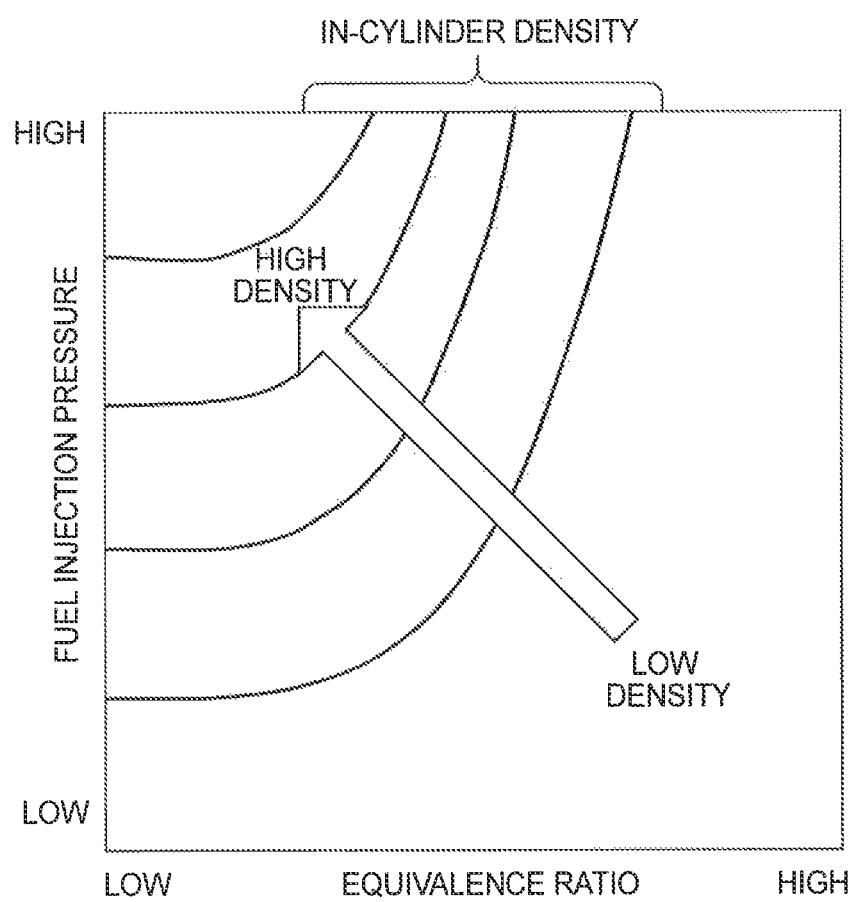
FIG. 7 is a view showing a characteristic of a map used to specify an in-cylinder density.

In the third embodiment, the in-cylinder density corresponding to the current equivalence ratio and fuel injection pressure is specified by referring to a map such as that shown in FIG. 7, on which the in-cylinder density is given using the equivalence ratio and the fuel injection pressure as variables. The respective openings of the EGR valves 22, 27 and the condensed water supply valve 38 are then determined so as to obtain an EGR gas supply rate and a condensed water supply rate corresponding to the specified in-cylinder density, whereupon the respective valves 22, 27, 38 are operated so as to obtain the determined openings.

Figure 8:
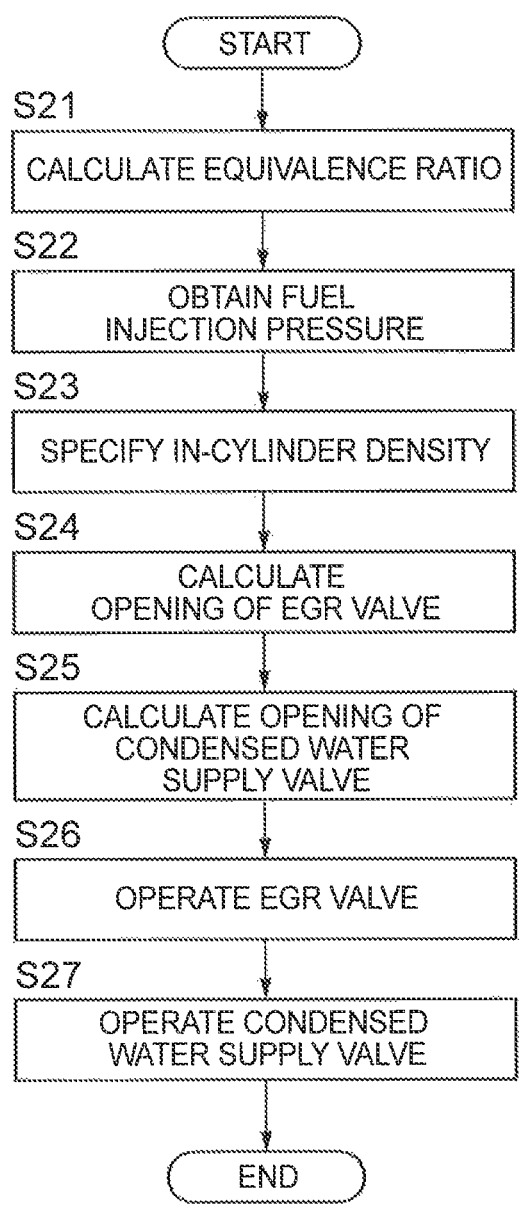
FIG. 8 is a flowchart showing an example of a control routine according to a third embodiment.
Figure 9:
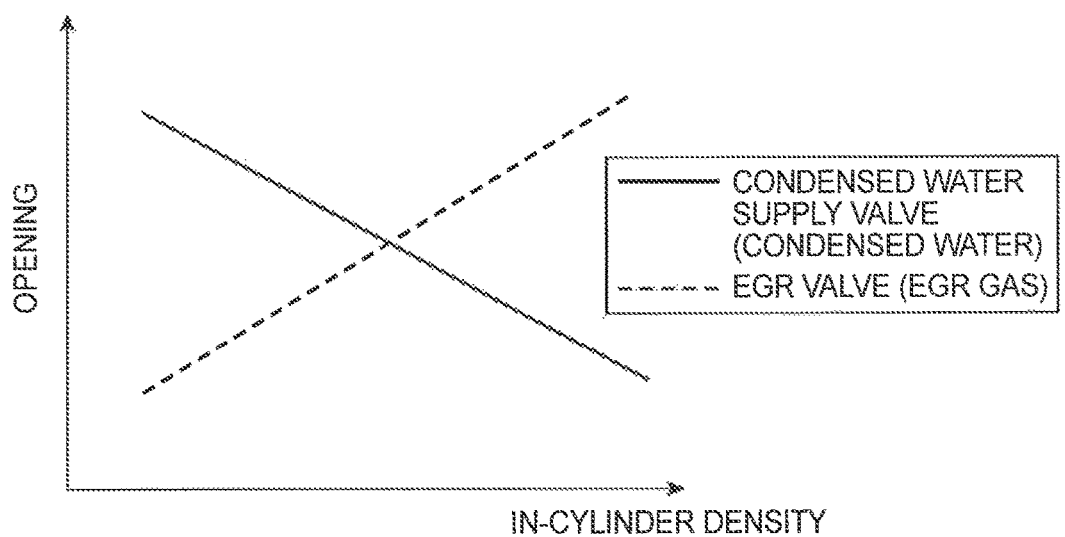
FIG. 9 is a view showing a characteristic of a calculation map used to calculate respective openings of an EGR valve and a condensed water supply valve from the in-cylinder density specified in FIG. 7.

A program of a control routine shown in FIG. 8 is stored in the ECU 40, read at an appropriate time, and executed repeatedly at predetermined intervals. In step S21, the ECU 40 calculates the equivalence ratio of the internal combustion engine 1A. The equivalence ratio may be calculated using either the method of the first embodiment or the method of the second embodiment. In step S22, the ECU 40 obtains the fuel injection pressure. The ECU 40 obtains the fuel injection pressure on the basis of an output signal from a pressure sensor, not shown in the drawings, attached to the common rail 5.

In step S23, the ECU 40 specifies the in-cylinder density corresponding to the current equivalence ratio and fuel injection pressure on the basis of the calculation map shown in FIG. 7, for example. In step S24, the ECU 40 calculates openings of the EGR valves 22, 27 corresponding to the in-cylinder density specified in step S23 by referring to a calculation map shown in FIG. 9, for example. In step S25, the ECU 40 calculates an opening of the condensed water supply valve 38 corresponding to the in-cylinder density specified in step S23 by referring to the same calculation map. The calculation map of FIG. 9 corresponds to an operating region where the ECU 40 uses the first EGR apparatus 20A alone. Note that calculation maps having similar characteristics to FIG. 9 are prepared respectively for the mode in which the two EGR apparatuses 20A, 20B are used simultaneously and the mode in which the second EGR apparatus 20B is used alone. In step S24 and step S25, the calculation map corresponding to the current operating region is selected, and the respective openings are calculated on the basis of the selected calculation map.

In step S26, the ECU 40 operates at least one of the first EGR valve 22 and the second EGR valve 27 so as to obtain the opening calculated in step S24. In step S27, the ECU 40 operates the condensed water supply valve 38 so as to obtain the opening calculated in step S25. The current routine is then terminated.

On the calculation maps used in steps S24 and S25 of FIG. 8, the openings of the respective valves 22, 28, 38 are calculated so as to realize the EGR gas supply rate and the condensed water supply rate at which to obtain the in-cylinder density specified by the map shown in FIG. 7. The in-cylinder density specified by the map shown in FIG. 7, similarly to that of FIG. 3, decreases steadily as the equivalence ratio increases. In other words, the in-cylinder density of the internal combustion engine 1A decreases at a high equivalence ratio and increases at a low equivalence ratio. The map of FIG. 7 defines the in-cylinder density at which an appropriate penetration strength is obtained on the basis of the equivalence ratio and the fuel injection pressure. The penetration of the fuel spray can therefore be made appropriate even when the fuel injection pressure varies. By executing the control routine shown in FIG. 8, the ECU 40 functions as the supply rate control means according to the invention. Further, by executing step S21 of FIG. 8, the ECU 40 functions as the equivalence ratio calculating means according to the invention.

(Fourth Embodiment)

Figure 10:
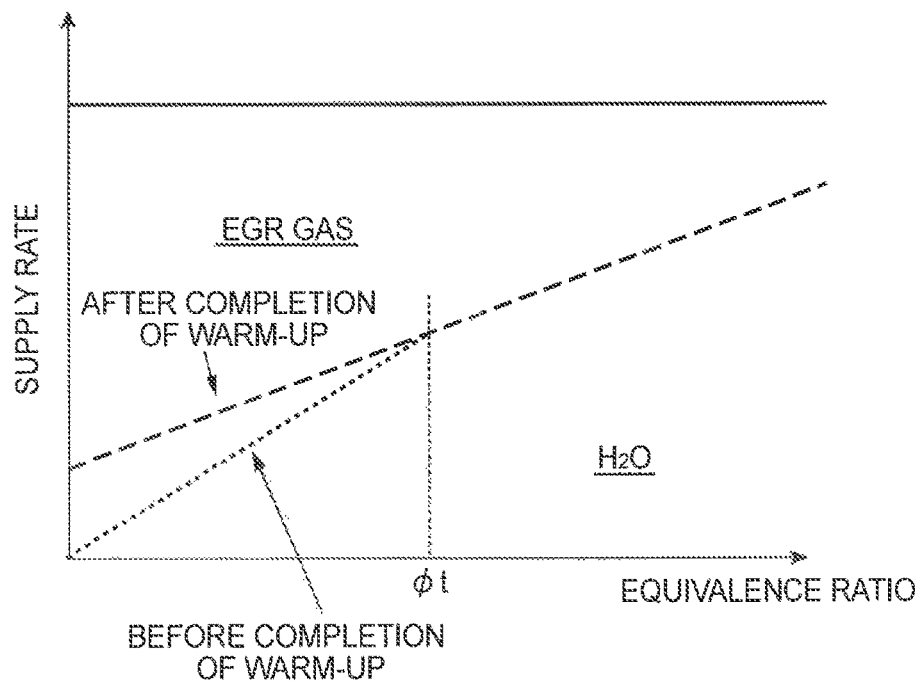
FIG. 10 is a view showing a characteristic of control according to a fourth embodiment.

Next, referring to FIGS. 10 and 11, a fourth embodiment of the invention will be described. The fourth embodiment is identical to the first embodiment apart from the control content. The physical configuration of the fourth embodiment can therefore be understood with reference to FIG. 1. In the fourth embodiment, as shown in FIG. 10, the EGR gas supply rate and the condensed water supply rate are controlled so that in a case where the equivalence ratio is lower than a predetermined value $\phi t$, the water ratio is lower before warm-up of the internal combustion engine 1A is complete than after warm-up is complete.

Figure 11:
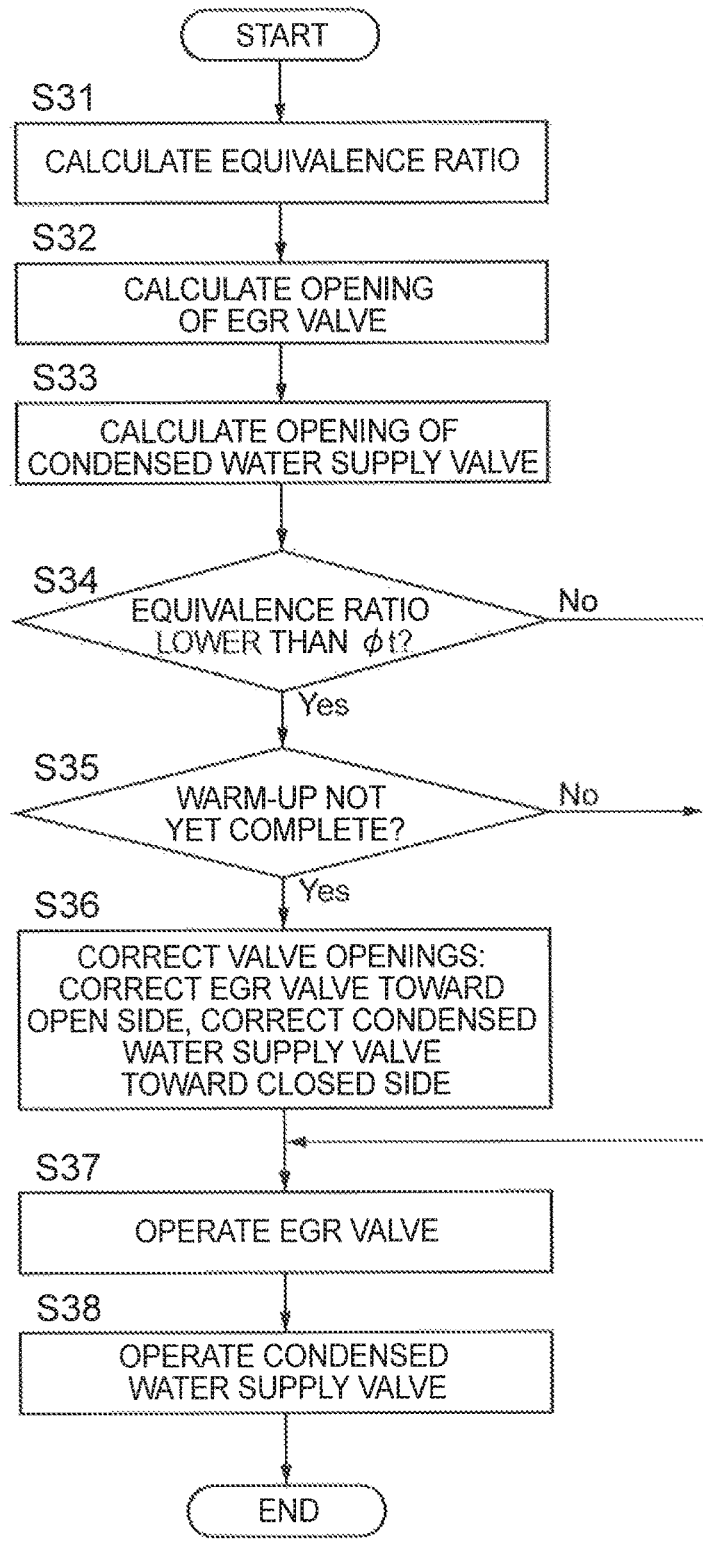
FIG. 11 is a flowchart showing an example of a control routine according to the fourth embodiment.

A program of a control routine shown in FIG. 11 is stored in the ECU 40, read at an appropriate time, and executed repeatedly at predetermined intervals. In step S31, the ECU 40 calculates the equivalence ratio of the internal combustion engine 1A. The equivalence ratio may be calculated using either the method of the first embodiment or the method of the second embodiment. In step S32, the ECU 40 calculates the openings of the EGR valves 22, 27. In step S33, the ECU 40 calculates the opening of the condensed water supply valve 38. Any one of the methods described in the first to third embodiments may be employed to calculate the respective openings in steps S32 and S33.

In step S34, the ECU 40 determines whether or not the equivalence ratio calculated in step S31 is smaller than the predetermined value $\phi t$. The predetermined value $\phi t$ is set in consideration of a degree of an adverse effect caused by fuel adhesion to the inner wall surface of the cylinder 2 prior to the completion of warm-up, to be described below. When the equivalence ratio is smaller than the predetermined value $\phi t$, or in other words when the equivalence ratio is lower than the predetermined value $\phi t$, the routine advances to step S35. When the equivalence ratio equals or exceeds the predetermined value $\phi t$, the routine skips step S35 and step S36 and advances to step S37.

In step S35, the ECU 40 determines whether or not warm-up of the internal combustion engine 1A is complete. The ECU 40 determines that warm-up is not yet complete when, for example, a cooling water temperature representing the temperature of the internal combustion engine 1A is lower than 80 degrees centigrade. When warm-up is not yet complete, the routine advances to step S36. When warm-up of the internal combustion engine 1A is complete, the routine skips step S36 and advances to step S37.

In step S36, the 40 corrects the respective openings of the EGR valves 22, 27 and the condensed water supply valve 38 calculated in step S32 and step S33. The respective openings are corrected by correcting the openings of the EGR valves 22, 27 toward an open side and correcting the opening of the condensed water supply valve 38 toward a closed side. Correction amounts are set in accordance with the equivalence ratio so as to obtain pre-warm-up completion supply rates, as shown in FIG. 10.

In step S37, the ECU 40 operates at least one of the first EGR valve 22 and the second EGR valve 27 so as to obtain either the opening calculated in step S32 or the corrected opening corrected in step S36. In step S38, the ECU 40 operates the condensed water supply valve 38 so as to obtain either the opening calculated in step S33 or the corrected opening corrected in step S36. The current routine is then terminated.

According to the fourth embodiment, when the equivalence ratio is lower than the predetermined value $\phi t$ and warm-up is not yet complete, the openings of the EGR valves 22, 27 are corrected toward the open side and the opening of the condensed water supply valve 38 is corrected toward the closed side in step S36 of FIG. 11. Accordingly, the condensed water supply rate when the equivalence ratio is lower than the predetermined value $\phi t$ becomes lower before warm-up is complete than after warm-up is complete. Hence, the in-cylinder density at a low equivalence ratio prior to the completion of warm-up becomes higher than the in-cylinder density following the completion of warm-up, with the result that the penetration of the fuel spray can be reduced in comparison with the penetration following the completion of warm-up. Therefore, fuel adhesion to the inner wall surface of the cylinder 2 prior to the completion of warm-up can be suppressed, and as a result, the amount of HC generated prior to the completion of warm-up can be reduced. By executing the control routine shown in FIG. 11, the ECU 40 functions as the supply rate control means according to the invention. Further, by executing step S31 of FIG. 11, the ECU 40 functions as the equivalence ratio calculating means according to the invention.

(Fifth Embodiment)

Figure 12:
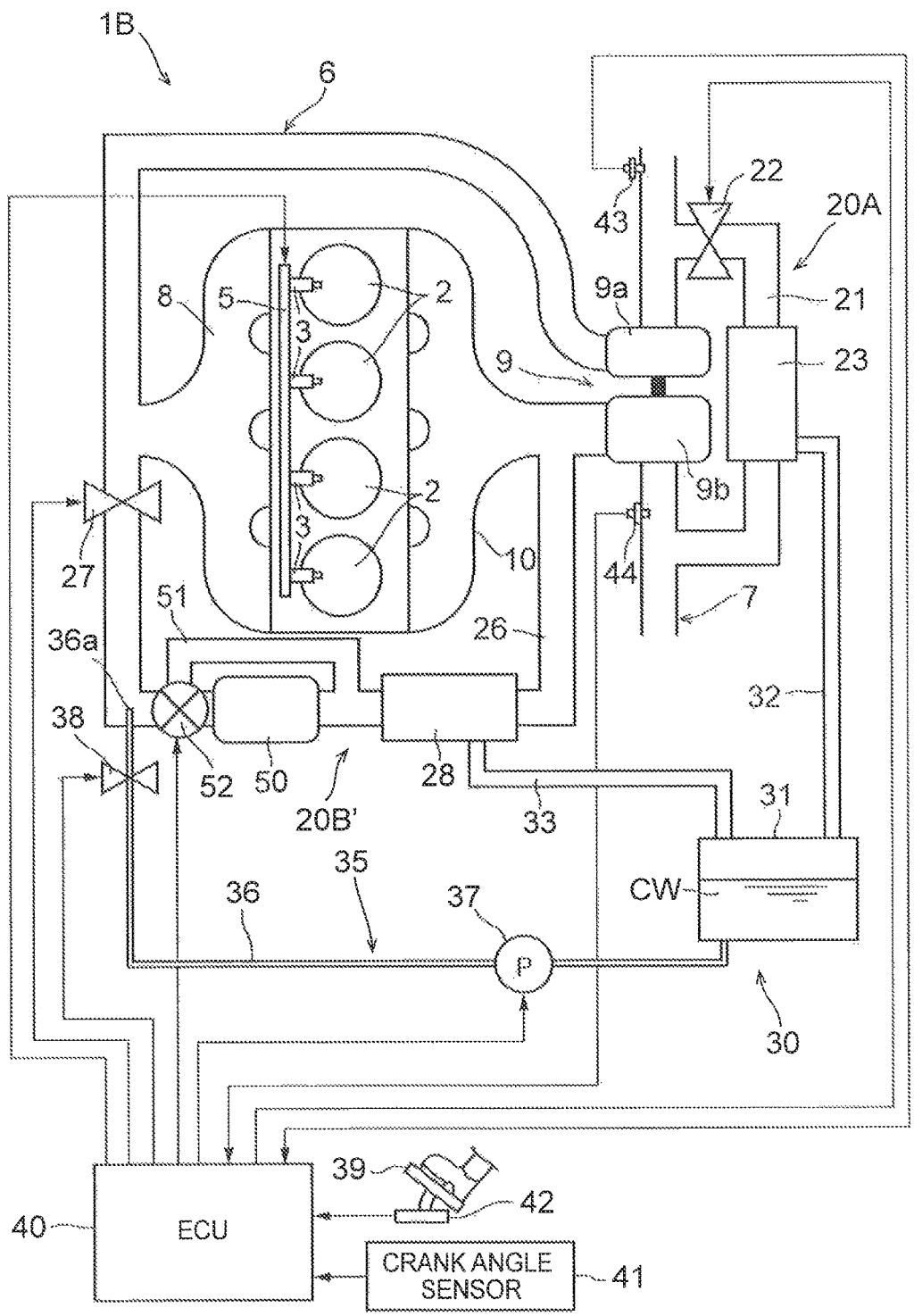
FIG. 12 is a view showing an overall configuration of an internal combustion engine according to a fifth embodiment.

Next, referring to FIGS. 12 to 14, a fifth embodiment of the invention will be described. As shown in FIG. 12, the fifth embodiment is applied to an internal combustion engine 1B that differs from the internal combustion engine 1A of FIG. 1 in the EGR system and a condensed water supply location. Configurations of the internal combustion engine 1B that are shared with the internal combustion engine 1A are illustrated in FIG. 12 using identical reference symbols, and description thereof has been omitted.

The internal combustion engine 1B includes the first EGR apparatus 20A and a second EGR apparatus 20B'. The second EGR apparatus 20B' is provided with a carbon dioxide separator (referred to hereafter as a separator) 50 serving as separating means that separates carbon dioxide from the EGR gas, a bypass passage 51 provided on the second EGR passage 26 so as to bypass the separator 50, and a flow distribution modification valve 52 provided in a convergence position between the bypass passage 51 and the second EGR passage 26 so as to be capable of continuously modifying a flow distribution between a flow through the bypass passage 51 and a flow through the separator 50. The separator 50 is provided in the second EGR passage 26 on a downstream side of the second EGR cooler 28. A conventional apparatus capable of separating carbon dioxide using one of various methods such as a chemical separation method or a physical adsorption method may be applied as the separator 50. The bypass passage 51 is connected between the second EGR cooler 28 and the separator 50 on an upstream side, and connected between the separator 50 and the second EGR valve 27 on a downstream side.

The flow distribution modification valve 52 is capable of modifying the flow distribution from a condition in which the separator 50 is closed so that the flow through the separator 50 remains at zero, whereby all of the EGR gas flowing through the second EGR passage 26 flows through the bypass passage 51, to a condition in which the bypass passage 51 is closed so that the flow through the bypass passage 51 remains at zero, whereby all of the EGR gas flowing through the second EGR passage 26 flows through the separator 50. By operating the flow distribution modification valve 52, the amount of carbon dioxide separated from the EGR gas can be adjusted. Hence, the bypass passage 51 and the flow distribution modification valve 52 function in combination as adjusting means according to the invention.

The condensed water supply mechanism 35 is configured such that the tip end portion 36a of the condensed water passage 36 is connected to the second passage 26 between the flow distribution modification valve 52 and the second EGR valve 27. As a result, the condensed water stored in the condensed water tank 31 can be supplied to the second EGR passage 26 between the flow distribution modification valve 52 and the second EGR valve 27. As described above, the condensed water supply amount can be controlled by operating the condensed water supply valve 38. By operating the flow distribution modification valve 52 and the condensed water supply valve 38 respectively, the proportions of water and carbon dioxide in the EGR gas can be modified. Hence, the separator 50, the bypass passage 51, the flow distribution modification valve 52, and the condensed water supply mechanism 35 together constitute component proportion modifying means according to the invention.

The ECU 40 controls the in-cylinder density by modifying the proportions of water and carbon dioxide in the EGR gas in accordance with the equivalence ratio of the internal combustion engine 1B. Similarly to the first to fourth embodiments described above, the in-cylinder density is controlled so as to decrease at a high equivalence ratio and increase at a low equivalence ratio. More specifically, the ECU 40 calculates proportions of water ($H_2O$) and carbon dioxide ($CO_2$) in the EGR gas corresponding to the equivalence ratio of the internal combustion engine 1B on the basis of the calculation map shown in FIG. 13, and then operates the flow distribution modification valve 52 and the condensed water supply valve 38 so that the calculated proportions can be realized.

Figure 14:
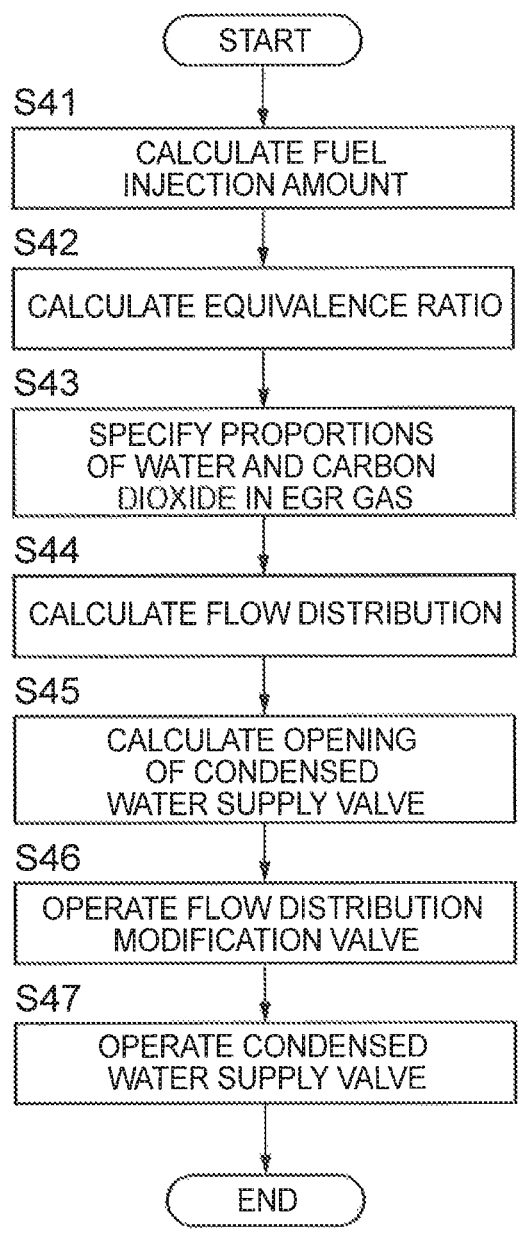
FIG. 14 is a flowchart showing an example of a control routine according to the fifth embodiment.

FIG. 14 shows an example of a control routine implemented by the ECU 40. A program of the control routine shown in FIG. 14 is stored in the ECU 40, read at an appropriate time, and executed repeatedly at predetermined intervals.

In step S41, the ECU 40 calculates the fuel injection amount of the internal combustion engine 1B. Similarly to the embodiments described above, the ECU 40 specifies the accelerator opening by referring to the output signal from the accelerator opening sensor 42, and calculates the fuel injection amount on the basis of the accelerator opening. In step S42, the ECU 40 calculates the basic equivalence ratio on the basis of the operating condition, or in other words the fuel injection amount (the load), of the internal combustion engine 1B. Similarly to the first embodiment, the basic equivalence ratio is an equivalence ratio defined univocally in accordance with the fuel injection amount arid specified by a map having a characteristic such as that shown in FIG. 4. Referring to the map shown in FIG. 4, the ECU 40 calculates the basic equivalence ratio on the basis of the fuel injection amount (the load) calculated in step S41 and whether or not is being implemented.

Figure 13:
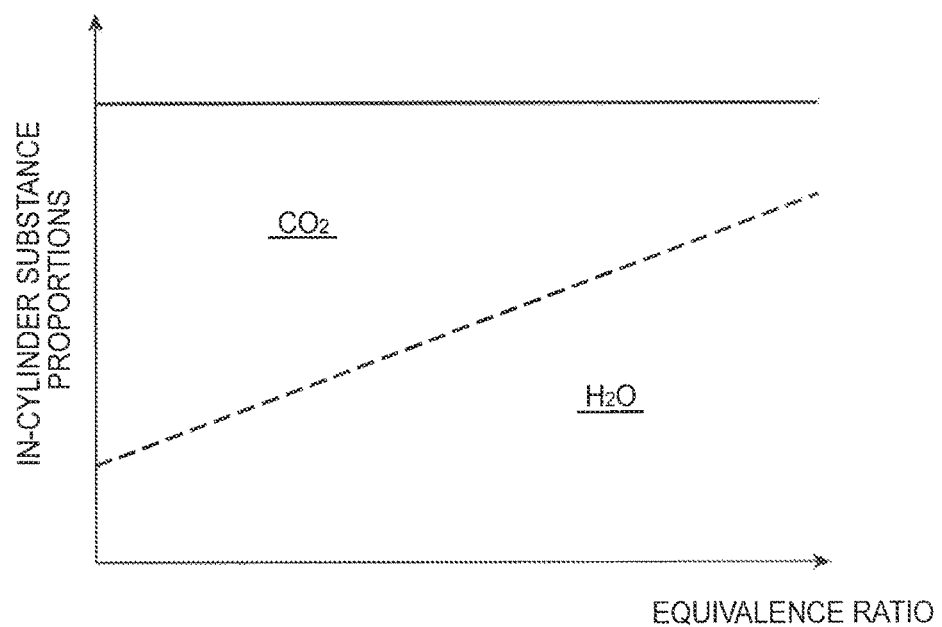
FIG. 13 is a view showing a characteristic of a calculation map used to specify proportions of water and carbon dioxide in the EGR gas.

In step S43, the ECU 40 specifies the proportions of water and carbon dioxide in the EGR gas corresponding to the equivalence ratio calculated in step S42 by referring to a calculation map shown in FIG. 13. In step S44, the ECU 40 calculates a flow distribution between the flow through the separator 50 and the flow through the bypass passage 51 so as to obtain the proportions of water and carbon dioxide specified in step S43. In step S45, the ECU 40 calculates an opening of the condensed water supply valve 38 at which the proportions of water and carbon dioxide specified in step S43 are obtained. The flow distribution and the opening are calculated in step S44 and step 545, respectively, on the basis of a calculation map, not shown in the drawings, determined in advance through prototype tests and simulations. Note that this embodiment is applied only to either the mode in which the two EGR apparatuses 20A, 20B' are used simultaneously or the mode in which the second EGR apparatus 20B' is used alone, and therefore the calculation map not shown in the drawings is prepared in relation to each of these two modes.

In step S46, the ECU 40 operates the flow distribution modification valve 52 so as to realize the flow distribution calculated in step S44. In step S47, the ECU 40 operates the condensed water supply valve 38 so as to obtain the opening calculated in step S45. The current routine is then terminated.

According to the control routine shown in FIG. 14, when EGR is implemented, the proportions of water and carbon dioxide in the EGR gas supplied to the cylinder 2 of the internal combustion engine 1B are controlled to the proportions shown in FIG. 13. More specifically, at a high equivalence ratio, the proportion of water in the EGR gas is higher and the proportion of carbon dioxide in the EGR gas is lower than at a low equivalence ratio. In other words, similarly to the embodiments described above, the in-cylinder density of the internal combustion engine 1B decreases at a high equivalence ratio and increases at a low equivalence ratio. Hence, the in-cylinder density decreases at a high equivalence ratio, and therefore diffusion of the fuel spray can be promoted, with the result that the amounts of generated smoke and HC can be suppressed. On the other hand, the in-cylinder density increases at a low equivalence ratio, and therefore the penetration of the fuel spray can be reduced, with the result that increases in cooling loss and the amount of generated HC caused by fuel adhesion to the inner wall surface of the cylinder 2 can be suppressed. By executing the control routine shown in FIG. 14, the ECU 40 functions as the component proportion control means according to the invention. Further, by executing step S42 of FIG. 14, the ECU 40 functions as the equivalence ratio calculating means according to the invention.

(Sixth Embodiment)

Figure 15:
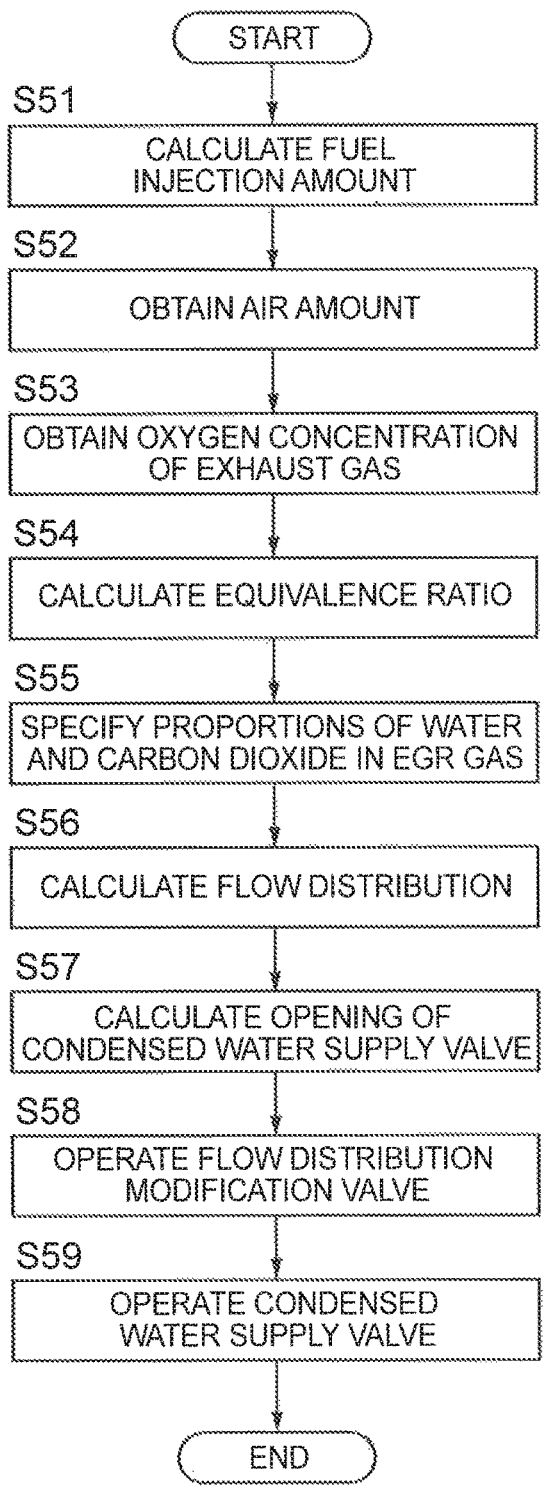
FIG. 15 is a flowchart showing an example of a control routine according to a sixth embodiment.

Next, referring to FIG. 15, a sixth embodiment of the invention will be described. The sixth embodiment is identical to the fifth embodiment apart from the control content. The physical configuration of the sixth embodiment can therefore be understood with reference to FIG. 14. The sixth embodiment differs from the fifth embodiment in the method of calculating the equivalence ratio. A program of a control routine shown in FIG. 15 is stored in the ECU 40, read at an appropriate time, and executed repeatedly at predetermined intervals.

In step S51, similarly to the fifth embodiment, the ECU 40 specifies the accelerator opening by referring to the output signal from the accelerator opening sensor 42, and calculates the fuel injection amount on the basis of the accelerator opening. In step S52, the ECU 40 obtains the air amount by referring to the output signal from the air flow meter 43. In step S53, the ECU 40 obtains the oxygen concentration of the exhaust gas by referring to the output signal from the exhaust gas A/F sensor 44. In step S54, the ECU 40 calculates the equivalence ratio of the internal combustion engine 1B on the basis of the fuel injection amount, the air amount, and the oxygen concentration obtained respectively in steps S51 to S53. Processing performed in steps S55 to S59 is identical to that of steps S43 to S47 according to the fifth embodiment, shown in FIG. 14, and therefore description thereof has been omitted.

According to the sixth embodiment, similarly to the fifth embodiment, the amounts of generated smoke and HC can be suppressed when the equivalence ratio is high, and increases in cooling loss and the amount of generated HC can be suppressed when the equivalence ratio is low. By executing the control routine shown in FIG. 15, the ECU 40 functions as the component proportion control means according to the invention. Further, by executing step S54 in FIG. 15, the ECU 40 functions as the equivalence ratio calculating means according to the invention.

The invention is not limited to the embodiments described above, and may be implemented in various embodiments within the scope of the spirit of the invention. In the first to fourth embodiments, condensed water is used as the low density substance, but using condensed water or water as the low density substance is merely an example. By supplying the low density substance to the intake system, the in-cylinder density can be varied. The object of the invention can be achieved likewise using an inert substance that has a lower molecular weight than carbon dioxide (molecular weight 44) and does not adversely affect combustion, such as helium, nitrogen, or neon, for example, instead of water as the low density substance.

In the first to fourth embodiments, condensed water generated in the exhaust system of the internal combustion engine is supplied to the cylinder, thereby eliminating the need to prepare and resupply a low density substance. Moreover, the supplied condensed water is vaporized in the cylinder, thereby reducing the combustion temperature. At a high equivalence ratio, therefore, the condensed water supply rate is increased instead of reducing the EGR gas supply rate, and as a result, a $NO_x$ generation suppression effect can be maintained while suppressing an increase in the in-cylinder density.

In the first to fourth embodiments, the EGR gas is supplied to the cylinder through the intake passage, but in a modified embodiment, the EGR gas may be supplied to the cylinder directly. Further, in the first to fourth embodiments, the condensed water is supplied to the cylinder through the intake passage, but instead, the condensed water may be supplied to the cylinder through the exhaust passage during a valve overlap period using a similar method to so-called internal EGR. Furthermore, the condensed water may be supplied to the cylinder directly. When an inert substance such as those mentioned above is used as the low density substance instead of condensed water or water, the inert substance may be supplied to the cylinder either indirectly through the intake passage or the exhaust passage or directly, i.e. without passing through the intake passage or the exhaust passage.

In the fifth and sixth embodiments, the proportions of water and carbon dioxide in the EGR gas are modified by supplying the condensed water using the condensed water supply mechanism 35 while separating carbon dioxide from the EGR gas using the separator 50. This is merely an example, however, and instead, for example, the invention may be implemented in an embodiment where carbon dioxide is added while separating water from the EGR gas. In this embodiment, a combination of means for separating water from the EGR gas and means for adding carbon dioxide corresponds to the component proportion modifying means according to the invention. In the fifth and sixth embodiments, the proportions of water and carbon dioxide in the EGR gas are modified using the condensed water generated in the exhaust system of the internal combustion engine, but using condensed water is merely an example, and instead, the invention may be implemented in an embodiment where water other than condensed water is prepared and added to the EGR gas. Similarly to the first to fourth embodiments, when condensed water is used, the need to prepare and resupply a low density substance can be eliminated. Moreover, the supplied condensed water is vaporized in the cylinder, thereby reducing the combustion temperature. At a high equivalence ratio, therefore, the proportion of water in the EGR gas is increased instead of reducing the proportion of carbon dioxide in the EGR gas, and as a result, the $NO_x$ generation suppression effect can be maintained while suppressing an increase in the in-cylinder density.

The control executed in the fifth and sixth embodiments may be modified to similar control to that of the third or fourth embodiment. As similar control to the third embodiment, the ECU 40 may calculate the proportion of water in the EGR gas and the proportion of carbon dioxide in the EGR gas on the basis of the fuel injection pressure as well as the equivalence ratio, and then operate the flow distribution modification valve 52 and the condensed water supply valve 38 respectively on the basis of the calculation result. Specific processing content is identical to the third embodiment. In other words, the ECU 40 calculates the in-cylinder density on the basis of the fuel injection pressure as well as the equivalence ratio by referring to a map such as that shown in FIG. 7, and calculates the proportions of water and carbon dioxide at which the calculated in-cylinder density is realized. As a result, the penetration of the fuel spray can be made appropriate in a similar manner to the third embodiment.

Further, as similar control to the fourth embodiment, the ECU 40 may operate the flow distribution modification valve 52 and the condensed water supply valve 38 respectively so that the proportion of carbon dioxide in the EGR gas in a case where the equivalence ratio of the internal combustion engine 1B is lower than the predetermined value is lower before warm-up of the internal combustion engine 1B is complete than after warm-up of the internal combustion engine 1B is complete. Specific processing content is identical to the fourth embodiment. In other words, when the equivalence ratio is lower than the predetermined value φt and warm-up is not yet complete, as shown in FIG. 10, the ECU 40 corrects an operation amount of the flow distribution modification valve 52 in a direction for increasing the flow distribution of the bypass passage 51, and corrects the opening of the condensed water supply valve 38 toward the closed side. Accordingly, the proportion of carbon dioxide in the EGR gas in a case where the equivalence ratio is lower than the predetermined value φt becomes lower before warm-up is complete than after warm-up is complete, and therefore the in-cylinder density at a low equivalence ratio before warm-up is complete becomes higher than the in-cylinder density after warm-up is complete. As a result, similarly to the fourth embodiment, the amount of HC generated prior to the completion of warm-up can be reduced.

In the above embodiments, two EGR apparatuses having different loop configurations are provided, but the invention may be implemented in an embodiment where only one EGR apparatus is provided. The internal combustion engine according to the above embodiments is configured as a diesel engine, but the invention is not limited to being applied to a diesel engine, and may be applied to any internal combustion engine in which fuel is injected into a cylinder, such as an in-cylinder direct injection type spark ignition internal combustion engine that uses gasoline as fuel. Furthermore, application of the invention is not affected by the presence or absence of a turbocharger, and therefore the invention may also be applied to a naturally aspirated internal combustion engine.

The invention claimed is:

1. A control apparatus for an internal combustion engine configured to infect fuel into a cylinder, the internal combustion engine including
   an EGR apparatus configured to supply a part of exhaust gas into the cylinder as EGR gas, and
   a low density substance supply apparatus configured to supply a low density substance having a lower density than the EGR gas into the cylinder, the control apparatus comprising an electronic control unit configured to
   (i) calculate an equivalence ratio of the internal combustion engine and
   (ii) control the EGR apparatus and the low density substance supply apparatus such that, when the equivalence ratio is high, a supply rate of the low density substance increases and a supply rate of the EGR gas decreases relative to when the equivalence ratio is low.

2. The control apparatus according to claim 1, wherein the electronic control unit is configured to calculate the equivalence ratio on the basis of an operating condition of the internal combustion engine.

3. The control apparatus according to claim 1, wherein the electronic control unit is configured to control the EGR apparatus and the low density substance supply apparatus such that the supply rate of the low density substance in a case where the equivalence ratio becomes lower than a predetermined value is lower before warm-up of the internal combustion engine is complete than after warm-up of the internal combustion engine is complete.

4. The control apparatus according to claim 1, wherein the electronic control unit is configured to
   (i) calculate the supply rate of the EGR gas and the supply rate of the low density substance on the basis of a fuel injection pressure as well as the equivalence ratio, and
   (ii) control the EGR apparatus and the low density substance supply apparatus on the basis of an obtained calculation result.

5. The control apparatus according to claim 1, wherein the low density substance supply apparatus is configured to supply condensed water generated in an exhaust system of the internal combustion engine into the cylinder as the low density substance.

* * * * *